T. D. INGERSOLL.
Horse Hay-Fork.
No. 100,767. Patented March 15, 1870.
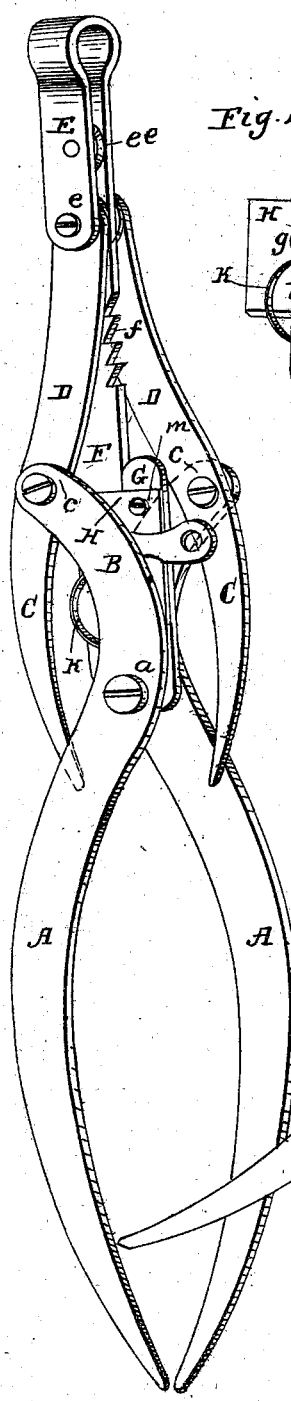
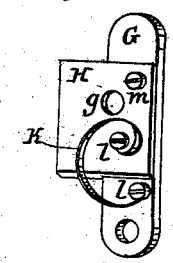
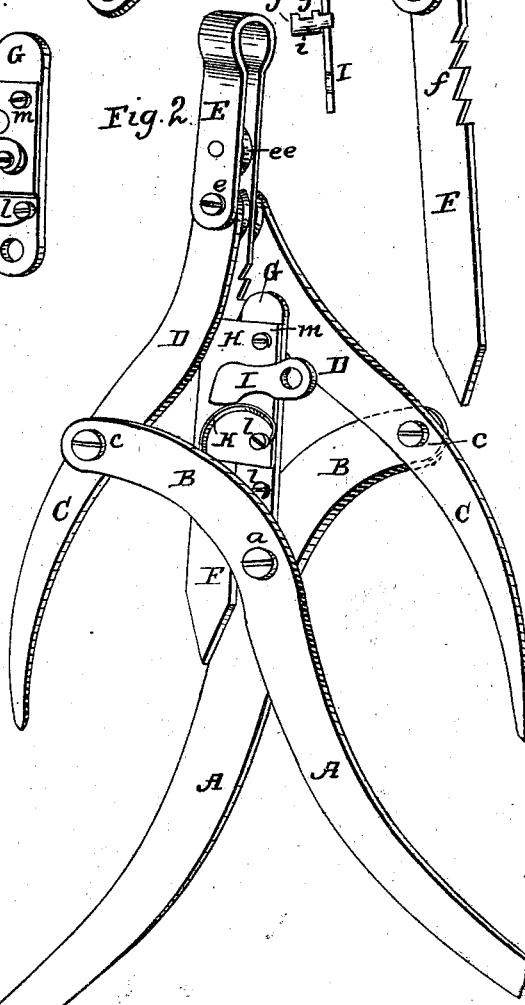
Witnesses:
Lewis Danah
Frank Raleigh
Inventor:
T. D. Ingersoll

United States Patent Office.

T. D. INGERSOLL, OF MONROE, MICHIGAN.

Letters Patent No. 100,767, dated March 15, 1870.

---

IMPROVEMENT IN HORSE HAY-FORKS.

---

The Schedule referred to in these Letters Patent and making part of the same

---

I, T. D. INGERSOLL, of Monroe, in the county of Monroe, and State of Michigan, have invented certain Improvements in Horse Hay-Forks, of which the following is a specification.

The nature of my invention consists in the combination and arrangement of a graduated automatic lock, in connection with an arrangement of tines; and has for its object the manufacture of an agricultural implement, convenient to handle, and efficient in operation for elevating or unloading hay and other similar substances.

Figure 1 is a perspective view of a machine embodying my invention, in its first and proper position for operation.

Figure 2 is a perspective view of the machine in its second and locked position.

Figure 3 represents the hoisting-loop E, carrying its tripping-cord, pulley $e\ e$, and the sliding bar F of the lock.

Figure 4 represents the sleeve H attached to the sleeve-bar G, also the lock-spring $k$ attached to the studs $l\ l$, and $m$ represents a stud for the locking-lever I to stop against.

Figure 5 represents the locking-lever I, with its lock-pivot J attached, showing lock-stop $i$ and its transverse groove $j$.

Figure 6 is a cross-section of the locking-lever I, lock-pivot J, lock-stop $i$, and transverse groove $j$.

In figs. 1 and 2—

A A are the principal or lifting-tines of the fork.

They are connected together by the pivoting-bolt $a$, but separated from each other by washers and the lower extremity of the sleeve-bar G of the lock, to give freedom of movement to the locking apparatus which they embrace, and also to prevent the wedging or clogging of the hay near the pivot.

The tines A A are extended above the pivot $a$ into curved arms B B, which are pivoted to the supplemental or holding-tines C C.

These tines are also extended above their pivots $c\ c$ into arms D D, and have their upper extremities pivoted at $e$ to the hoisting-loop E and sliding bar F of the lock.

The tripping-cord pulley is shown at $e\ e$.

One leg of the loop E is carried downward, and forms the sliding bar F.

Its edge in contact with the sleeve-bar G is notched at $f$, and engages with the lock-stop $i$ of the lock-pivot J, (see figs. 3, 5, and 6.)

The sleeve H (see fig. 4) is rigidly attached to the sleeve-bar G, and incloses the sliding bar F, holding it in place, and the sliding bar F holds in place the lock-pivot J, both maintaining their freedom of movement.

The lock-spring $k$ is fastened at each end to studs $l\ l$, set in the sleeve-bar G, and acts against the locking-lever I.

The stud $m$, set in the sleeve-bar G, stops the upward movement of the locking-lever I; and the movement of all parts of the machine is stopped at its first position by the heads of the pivot-bolts $c\ c$ of the arms B B, as seen in fig. 1; or the movement may be stopped by one or more studs set in the arms D D at any suitable point.

The locking-lever I, figs. 5 and 6, has a pivot, J, set near one end, at a right angle with its plane.

A pivot-hole, $g$, fig. 4, is cut through the sleeve H and edge of the sleeve-bar G, for its reception. Half the pivot-hole is cut from the sleeve H; the other half is cut from the edge of the sleeve-bar G; so that, when the pivot takes its place in the pivot-hole, part of one side of the pivot will occupy the recess in the edge of the sleeve-bar, and the opposite side will stand in the sleeve-chamber and obstruct the passage of the sliding bar F.

It, therefore, becomes necessary to cut away that portion of the pivot occupying the sleeve-chamber, making a transverse groove sufficiently wide and deep for a free movement of the sliding bar.

The corresponding portion of the pivot that remains opposite the bottom of the groove $j$ forms a lock-stop $i$, which engages with the several notches of the sliding bar.

Thus a graduated automatic lock is formed, enabling the operator to take up a large or small quantity of hay, as he may desire.

When in use, the operator plunges the fork into the hay, the lifting-tines A A dive downward and outward in a curved direction under the hay to be raised, while the arms B B move outward, carrying the lower extremities of the supplemental tines C C outward and downward into the hay, and the fork is locked automatically.

If the hay is not sufficiently packed between the upper and lower tines, the operator should force the fork further into the hay, and compel it to lock at another point.

The fork may be unlocked by jerking the tripping-cord. The lock-stop is withdrawn from the notches of the sliding bar, the load falls, and the fork automatically resumes its former position, represented in fig. 1.

I claim—

1. In a horse hay-fork, the automatic locking-lever I, its lock-pivot J, and lock-stop $i$, in combination with the sliding bar F and sleeve-bar G, with its attachments H, $l\ l$, $m$, and $k$, substantially as and for the purpose hereinbefore set forth.

2. The arrangement and combination of the lifting-tines A A, arms B B, supplemental tines C C, arms D D, sleeve-bar G, and sliding bar F of the locking device, substantially as set forth.

T. D. INGERSOLL.

Witnesses:
LEWIS DARRAH,
FRANK RALEIGH.